(12) United States Patent
Huang

(10) Patent No.: US 7,535,197 B2
(45) Date of Patent: May 19, 2009

(54) RECHARGEABLE ELECTRICAL TOOL AND BATTERY CHARGER THEREFOR

(75) Inventor: Wen-Hai Huang, Taichung (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 390 days.

(21) Appl. No.: 11/404,860

(22) Filed: Apr. 17, 2006

(65) Prior Publication Data

US 2007/0247113 A1    Oct. 25, 2007

(51) Int. Cl.
*H01M 10/46* (2006.01)
(52) U.S. Cl. ....................................................... 320/115
(58) Field of Classification Search ................ 320/107, 320/112, 114, 115
See application file for complete search history.

(56) References Cited

U.S. PATENT DOCUMENTS 5,035,024 A *   7/1991   Steiner et al. ................ 320/115
6,023,147 A *   2/2000   Cargin et al. ................. 320/114

* cited by examiner

*Primary Examiner*—Edward Tso
(74) *Attorney, Agent, or Firm*—Bacon & Thomas, PLLC

(57) ABSTRACT

An electrical tool assembly includes a battery-operated electrical tool, which has a housing and a charging terminal mounted in an insertion portion of the housing, and a charger, which has a receptacle fitting the contour of the insertion portion for the insertion of the insertion portion in a predetermined direction, a charging terminal for receiving the charging terminal of the electrical tool to charge the rechargeable battery of the battery-operated electrical tool, and a recessed seat for holding a body of the housing of the electrical tool in position upon insertion of the insertion portion into the receptacle.

8 Claims, 5 Drawing Sheets

RECHARGEABLE ELECTRICAL TOOL AND BATTERY CHARGER THEREFOR

BACKGROUND OF THE INVENTION

1. Field of the Invention

The present invention relates to electrical tools and more particularly, to an electrical tool assembly comprising a rechargeable electrical tool and a battery charger for charging the electrical tool.

2. Description of the Related Art

A commercial electrical tool is known having a rechargeable battery mounted inside the housing thereof to provide the necessary working power. When the power of the battery is used up, a battery charger must be used to charge the rechargeable battery to the saturated status.

The aforesaid electrical tool has a pair of metal contacts exposed to the outside of the housing and respectively electrically connected to the positive and negative poles of the battery. Further, a battery charger for charging the aforesaid electrical tool has two power output metal contacts corresponding to the metal contacts of the electrical tool. When the electrical tool is set in the battery charger, the two metal contacts of the electrical tool are respectively kept in contact with the metal contacts of the battery charger, enabling the battery charger to charge the battery of the electrical tool.

According to the aforesaid design, it is difficult to position the electrical tool on the battery charger quickly. Further, improper positioning of the electrical tool on the battery charger results in unstable contact between the metal contacts of the electrical tool and the metal contacts of the battery charger, i.e., the metal contacts of the electrical tool cannot be kept in contact with the metal contacts of the battery charger positively if the electrical tool is not accurately positioned on the battery charger. In this case, the user must correct the position of the electrical tool on the battery charger to have the electrical tool in accurate connection with the metal contacts of the charging circuit of the battery charger.

Therefore, it is desirable to provide an electrical tool assembly that eliminates the aforesaid problem.

SUMMARY OF THE INVENTION

The present invention has been accomplished under the circumstances in view. It is therefore one object of the present invention to provide an electrical tool assembly, which comprises an electrical tool and a charger. The electrical tool can quickly and accurately be positioned on the charger for enabling the charging circuit of the charger to charge the battery of the electrical tool positively.

To achieve this object of the present invention, the electrical tool assembly comprises an electrical tool and a charger. The electrical tool comprises a housing, a power drive, a tool-holding member, a rechargeable battery, and a charging terminal. The housing has an insertion portion. The insertion portion has an opening in communication between the inside and the outside of the housing. The power drive is mounted inside the housing. The tool-holding member is mounted in the housing and coupled to the power drive. The rechargeable battery is mounted inside the housing and electrically coupled to the power drive. The charging terminal is mounted in the housing and provided with a base, which has an insertion hole aimed at the opening at the insertion portion, a first contact shaped like a cylinder and coaxially suspended in the insertion hole and electrically coupled to the rechargeable battery, and a second contact mounted on the periphery wall of the insertion hole and spaced around the first contact of the charging terminal of the electrical tool and electrically coupled to the rechargeable battery. The charger is adapted to receive the electrical tool and to charge the rechargeable battery. The charger comprises a deck having a receptacle for receiving the insertion portion of the housing, a charging circuit board and a charging terminal. The receptacle has a bottom through hole in communication with the inside space of the deck. The charging circuit board is mounted inside the deck and has a charging circuit for charging the rechargeable battery. The charging terminal of the charger comprises an electrically insulative tubular base inserted through the bottom through hole into the receptacle for receiving the base of the charging terminal of the electrical tool upon insertion of the insertion portion of the housing of the electrical tool into the receptacle of the deck, a first contact mounted on an inside wall of the tubular base and electrically coupled to the charging circuit for the contact of the first contact of the charging terminal of the electrical tool upon insertion of the insertion portion of the housing of the electrical tool into the receptacle of the deck, and a second contact mounted on an outside wall of the tubular base and electrically coupled to the charging circuit for the contact of the second contact of the charging terminal of the electrical tool upon insertion of the insertion portion of the housing of the electrical tool into the receptacle of the deck.

DETAILED DESCRIPTION OF THE INVENTION

Figure 1:
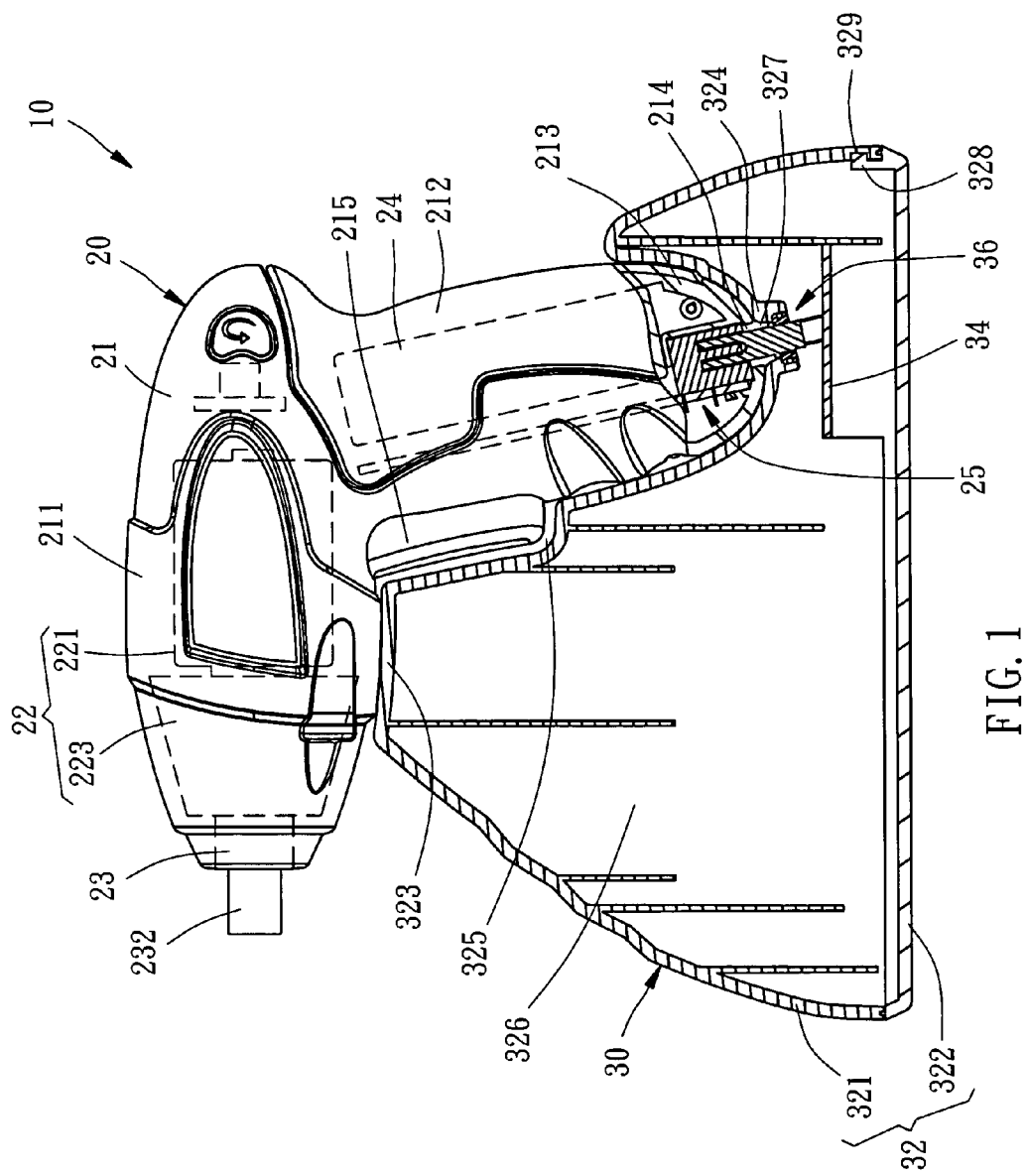
FIG. 1 is a schematic sectional view of an electrical tool assembly in accordance with a preferred embodiment of the present invention, showing that the electrical tool is positioned on the charger.
Figure 2:
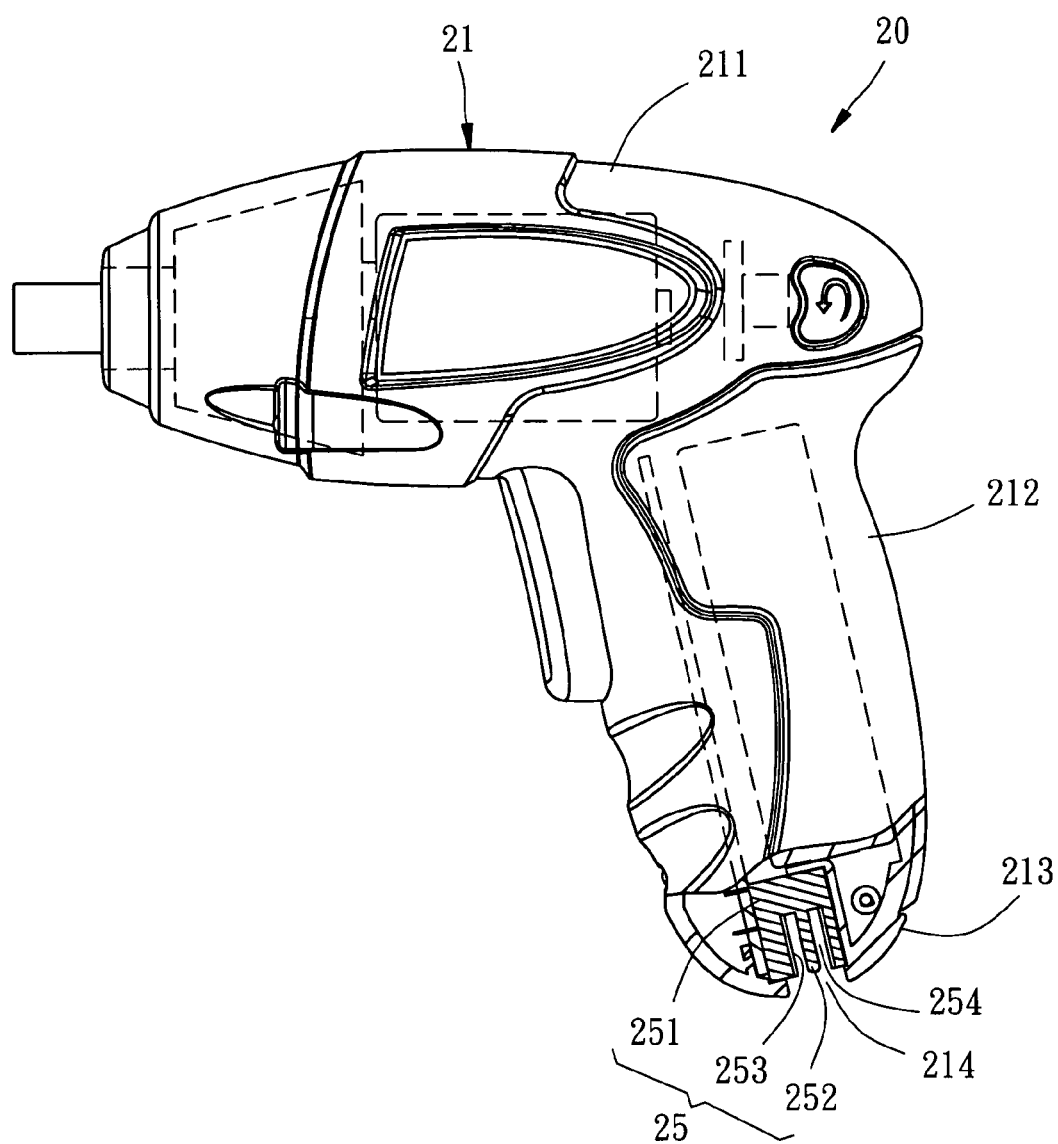
FIG. 2 is a sectional view of a part of the present invention, showing the structure of the electrical tool.
Figure 3:
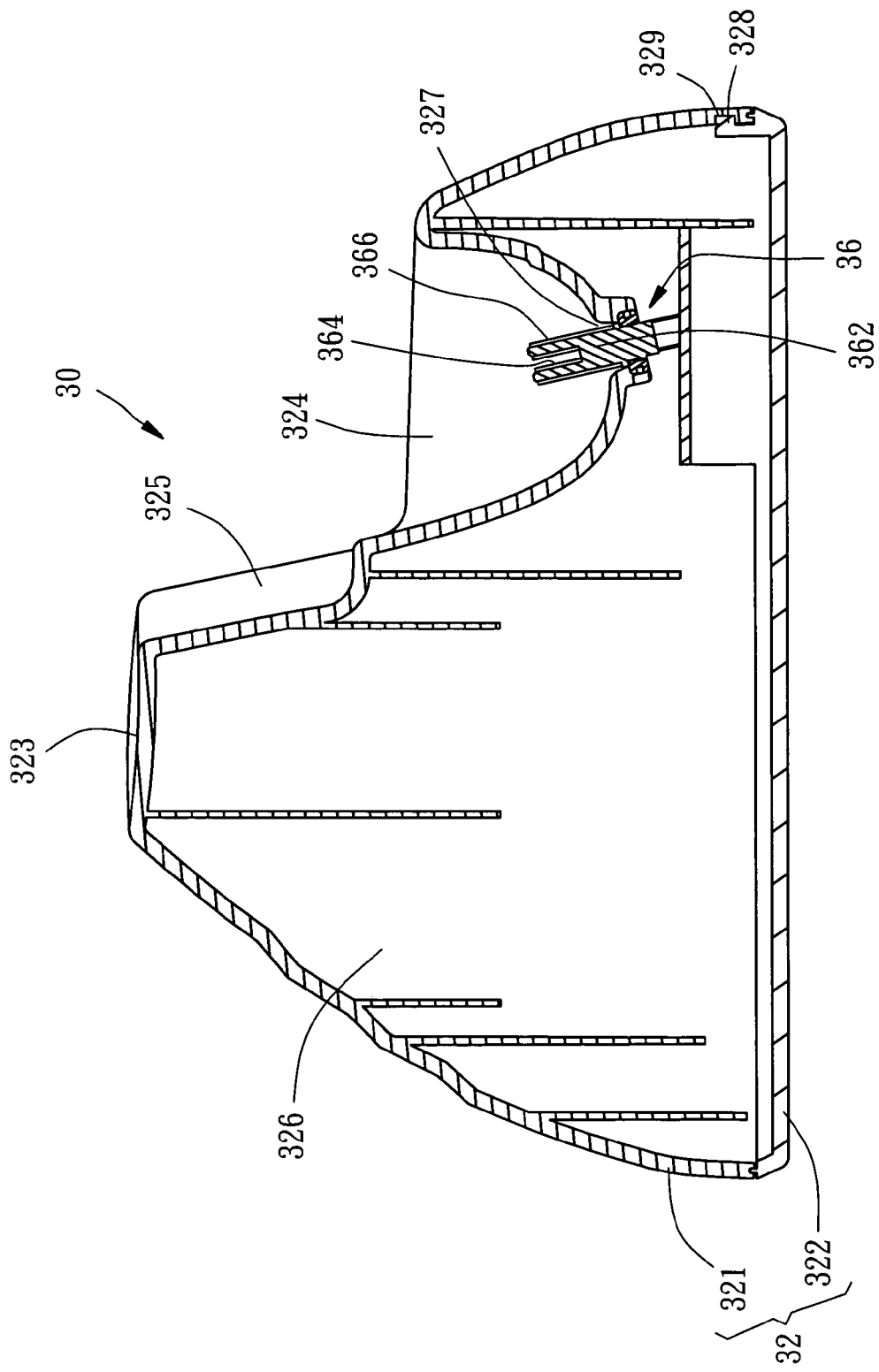
FIG. 3 is a sectional view of a part of the present invention, showing the structure of the charger.
Figure 4:
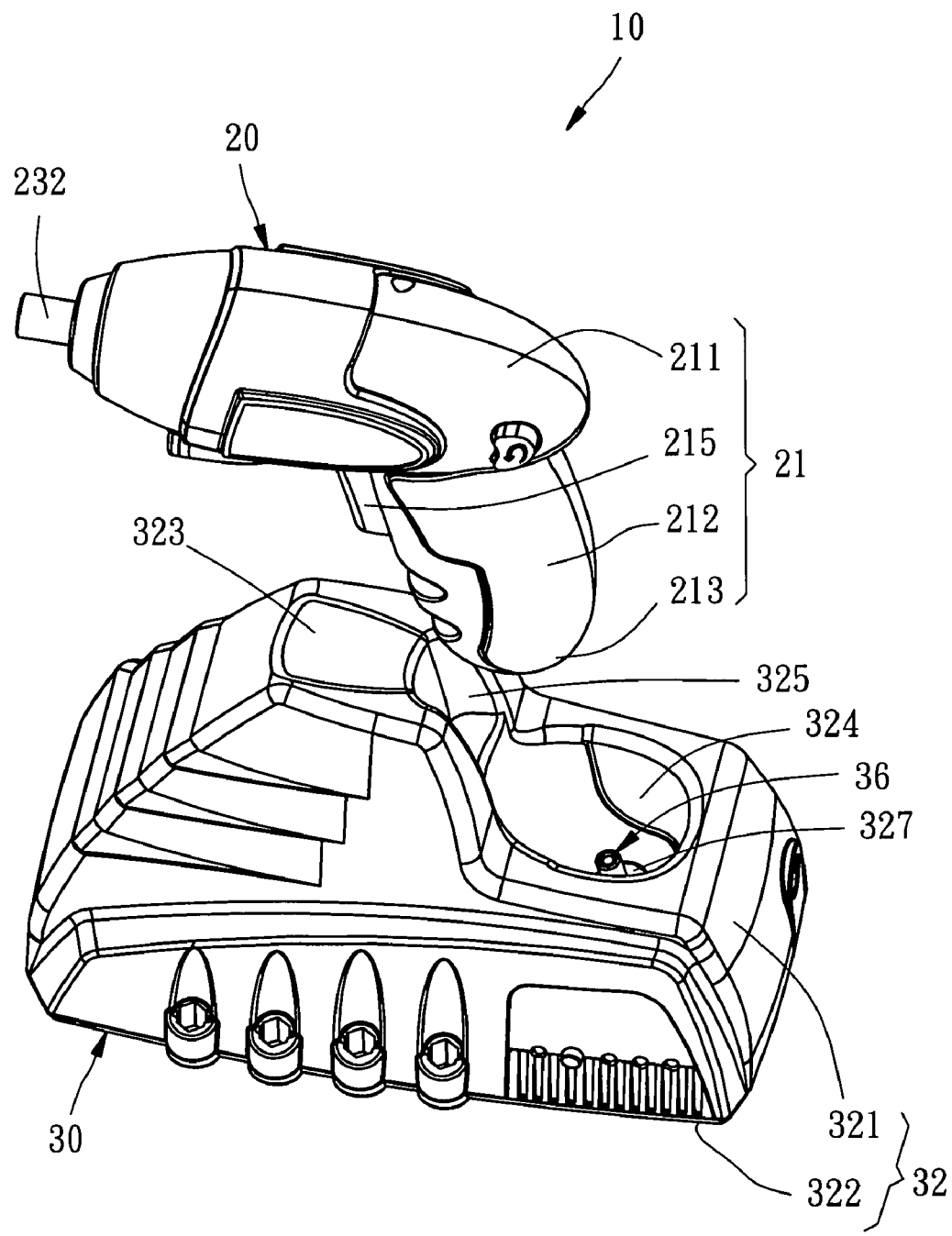
FIG. 4 is a perspective view of the electrical tool and the charger according to the preferred embodiment of the present invention.
Figure 5:
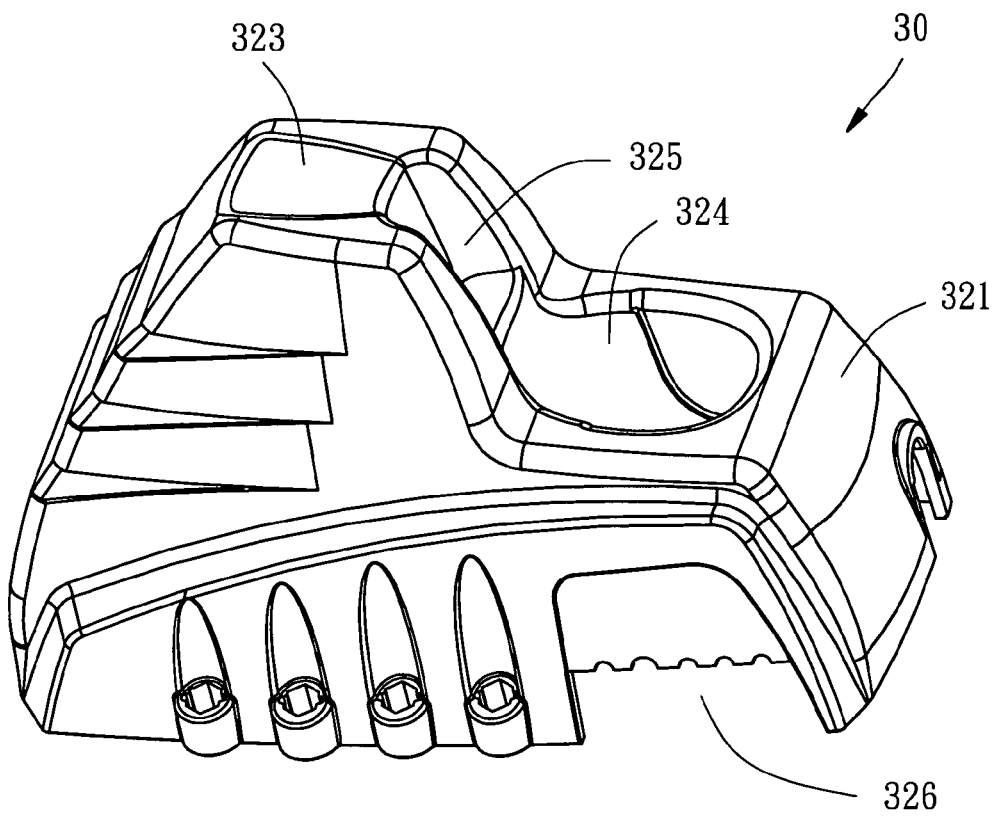
FIG. 5 is an exploded view of the charger of the electrical tool assembly according to the present invention.
Figure 5:
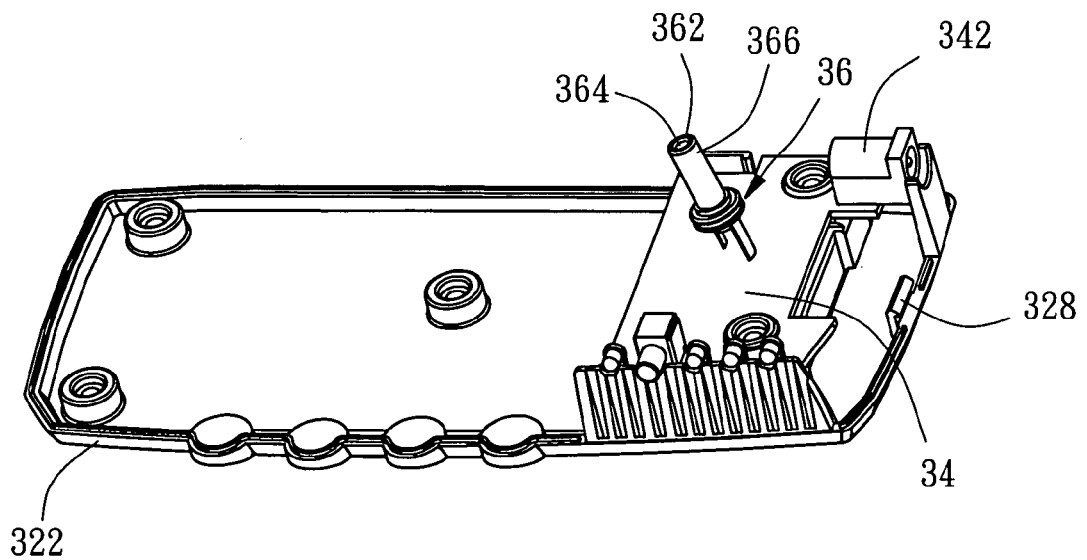

Referring to FIGS. 1-4, an electrical tool assembly 10 in accordance with a preferred embodiment of the present invention is shown comprising an electrical tool 20 and a charger 30.

The electrical tool 20 comprises a housing 21, a power drive 22, a tool-holding member 23, a rechargeable battery 24, and a charging terminal 25.

The housing 21 comprises a body 211 and a handle 212. The handle 212 extends outwards from one side of the body 211 at a predetermined angle. The rear end of the handle 212 is gradually reducing in diameter and smoothly arched, configuring an insertion portion 213. The insertion portion 213 has an opening 214 at the bottom side. Further, a trigger 215 is mounted on the handle 212 for starting the electrical tool 20.

The power drive 22 is mounted inside the body 211 of the housing 21, comprising a motor 221 and a transmission gear set 223.

The tool-holding member 23 is mounted in one side of the body 211 of the housing 21 remote from the handle 212, having a coupler 232 extending out of the body 211 for holding a tool, such as drill bit, screwdriver bit, etc. The tool-holding member 23 is coupled to the transmission gear set 223 and rotatable by the motor 221.

The battery 24 is mounted inside the handle 212 of the housing 21 and electrically connected to the motor 221 to provide the motor 221 with the necessary working power.

The charging terminal 25 is mounted in the insertion portion 213 of the housing 21, having an electrically insulative base 251, a first contact 252, and a second contact 253. The base 251 has an insertion hole 254 aimed at the opening 214 at the insertion portion 213. The first contact 252 is a cylindrical metal contact coaxially suspending in the insertion hole 254. The second contact 253 is mounted on the peripheral wall of the insertion hole 254 and spaced around the first contact 252. The first contact 252 and the second contact 253 are respectively electrically coupled to the positive and negative terminals of the battery 24.

The charger 30 comprises a deck 32, a charging circuit board 34, and a charging terminal 36. The deck 32 has a top cover shell 321 and a bottom cover shell 322. The top cover shell 321 has a recessed seat 323 and a receptacle 324 disposed at the top at different elevations, a locating groove 325 abutted to one side of the recessed seat 323. The receptacle 324 is configured to fit the contour of the smoothly arched and gradually reducing insertion portion 213 of the electrical tool 20 so that the insertion portion 213 of the electrical tool 20 can only be inserted into or moved out of the receptacle 324 in a particular direction. After insertion of the insertion portion 213 into the receptacle 324, the insertion portion 213 is kept in the receptacle 324 firmly in position. At this time, the body 211 of the electrical tool 20 is partially positioned on the recessed seat 323, and the trigger 215 of the handle 212 is positioned in the locating groove 325. Further, the deck 32 defines an accommodation chamber 326. The receptacle 324 has a bottom through hole 327 in communication with the accommodation chamber 326. The top cover shell 321 has a retaining groove 329 disposed inside the accommodation chamber 326 near the bottom. The bottom cover shell 322 has a hooked portion 328 for engaging the retaining groove 329 to secure the top cover shell 321 and the bottom cover shell 322 together.

The central axis of the insertion hole 254 of the charging terminal 25 of the electrical tool 20 is in parallel to the insertion direction in which the insertion portion 213 is inserted into or moved away from the receptacle 324.

The charging circuit board 34 is mounted on the bottom cover shell 322 inside the deck 32, having a charging circuit and a power jack 342. The power jack 342 is adapted to receive one end of a power cord, which has an electric plug at the other end for connection to an electric outlet to provide the charging circuit board 34 with the necessary charging power for charging the battery 24 of the electrical tool 20.

The charging terminal 36 of the charger 30 comprises an electrically insulative tubular base 362, a first contact 364, and a second contact 366. The tubular base 362 is fixedly mounted on the charging circuit board 34 and inserted through the bottom through hole 327 into the receptacle 324. The central axis of the tubular base 362 is kept in parallel to the insertion direction in which the insertion portion 213 is inserted into or moved away from the receptacle 324. The first contact 364 is mounted on the inside wall of the tubular base 362. The second contact 366 is mounted on the outside wall of the tubular base 362. Further, the first contact 364 and the second contact 366 are respectively electrically coupled to the positive and negative poles of the charging circuit of the charging circuit board 34. When the insertion portion 213 of the electrical tool 20 is inserted into the receptacle 324 of the charger 30, the tubular base 362 of the charging terminal 36 of the charger 30 is inserted through the opening 214 of the insertion portion 213 into the insertion hole 254 of the charging terminal 25 of the electrical tool 20, and the first contact 252 of the charging terminal 25 of the electrical tool 20 is inserted into the tubular base 362 of the charging terminal 36 of the charger 30, and therefore the first contact 252 and second contact 253 of the charging terminal 25 of the electrical tool 20 are respectively electrically connected to the first contact 364 and second contact 366 of the charging terminal 36 of the charger 30.

Because the contour of the insertion portion 213 matches the configuration of the receptacle 324 and because the central axis of the insertion hole 254 of the charging terminal 25 of the electrical tool 20 and the central axis of the tubular base 362 of the charging terminal 36 of the charger 30 are in parallel to the insertion direction in which the insertion portion 213 is inserted into or moved away from the receptacle 324, the electrical tool 20 can positively and accurately be inserted into the charger 30, keeping the charging terminal 25 of the electrical tool 20 and the charging terminal 36 electrically connected. Further, when the electrical tool 20 is inserted into the charger 30, a part of the body 211 and the trigger 215 of the electrical tool 20 are respectively positioned in the recessed seat 323 and the locating groove 325, and therefore the electrical tool 20 is prohibited from displacement relative to the charger 30.

As stated above, when the electrical tool assembly 10 is charging the battery, the electrical tool 20 is kept positively inserted in the charger 30.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An electrical tool assembly comprising:

an electrical tool comprising a housing having an insertion portion with an opening in communication between the inside and the outside of said housing, a power drive mounted inside said housing, a tool-holding member mounted in said housing and coupled to said power drive, a rechargeable battery mounted inside said housing and electrically coupled to said power drive, and a charging terminal mounted in said housing, the charging terminal of said electrical tool having a base with an insertion hole aimed at the opening at said insertion portion, a substantially cylinder-shaped first contact coaxially suspended in said insertion hole and electrically coupled to said rechargeable battery, and a second contact mounted on a periphery wall of said insertion hole and spaced around the first contact of the charging terminal of said electrical tool and electrically coupled to said rechargeable battery; and a charger for receiving said electrical tool to charge said rechargeable battery, said charger comprising a deck having a receptacle for receiving said insertion portion of said housing with a bottom through hole in communication with an inside space of said deck, a charging circuit board mounted inside said deck and provided with a charging circuit for charging said rechargeable battery, and a charging terminal, the charging terminal of said charger having an electrically insulative tubular base inserted through said bottom through hole into said receptacle for receiving the base of the charging terminal of said electrical tool upon insertion of the insertion portion of said housing of said electrical tool into said receptacle of said deck, a first contact mounted on an inside wall of said tubular base and electrically coupled to said charging circuit for the contact of the first contact of the charging terminal of said electrical tool upon insertion of the insertion portion of said housing of said electrical tool into said receptacle of said deck, and a second contact mounted on an outside wall of said tubular base and electrically coupled to said charging circuit for the contact of the second contact of the charging terminal of said electrical tool upon insertion of the insertion portion of said housing of said electrical tool into said receptacle of said deck.

2. The electrical tool assembly as claimed in claim 1, wherein said insertion portion of said housing and said receptacle of said deck are configured such that said insertion portion of said housing is movable in and out of said receptacle of said deck in a predetermined insertion direction; said insertion hole and said tubular base have the respective central axis disposed in parallel to said predetermined insertion direction.

3. The electrical tool assembly as claimed in claim 1, wherein said housing has a body; said deck has a recessed seat for receiving the body of said housing when the insertion portion of said housing of said electrical tool is inserted into said receptacle of said deck.

4. The electrical tool assembly as claimed in claim 3, wherein said power drive is mounted inside said body of said housing.

5. The electrical tool assembly as claimed in claim 4, wherein said power drive comprises a motor and a transmission gear set coupled to said motor; said tool-holding member is mounted in said body of said housing and coupled to said transmission gear, said tool-holding member having a coupler extending out of said body of said housing and rotatable with said transmission gear set by said motor.

6. The electrical tool assembly as claimed in claim 3, wherein said housing further has a handle extending from one side of said body at a predetermined angle and terminating in said insertion portion.

7. The electrical tool assembly as claimed in claim 6, wherein said insertion portion of said housing is smoothly arched, having an outer diameter gradually reducing from said body toward a distal end thereof; said receptacle of said deck has a configuration fitting the smoothly arched and gradually reducing contour of said insertion portion of said housing.

8. The electrical tool assembly as claimed in claim 6, wherein said electrical tool further comprises a trigger mounted on said handle for starting said power drive; said deck has a locating groove for receiving said trigger when the body of said housing of said electrical tool is positioned in said recessed seat of said deck.

* * * * *